United States Patent
Kawano

(10) Patent No.: US 8,936,294 B2
(45) Date of Patent: Jan. 20, 2015

(54) VEHICLE LUGGAGE COMPARTMENT STRUCTURE

(71) Applicant: Suzuki Motor Corporation, Shizuoka-ken (JP)

(72) Inventor: Masayoshi Kawano, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 14/109,252

(22) Filed: Dec. 17, 2013

(65) Prior Publication Data

US 2014/0300127 A1 Oct. 9, 2014

(30) Foreign Application Priority Data

Apr. 5, 2013 (JP) .................................. 2013-079502

(51) Int. Cl.
*B60R 11/06* (2006.01)
*B60R 13/01* (2006.01)

(52) U.S. Cl.
CPC ......... *B60R 13/011* (2013.01); *B60R 2013/018* (2013.01)
USPC ...................................................... 296/37.1

(58) Field of Classification Search
CPC .. A45C 13/262; A45C 5/14; A45C 2013/267; A45C 13/26; A45C 13/021; A45C 13/385; B62B 2202/24; B62B 1/125; A45F 3/02
USPC ..................... 296/37.1, 37.16, 37.8
See application file for complete search history.

(56) References Cited

U.S. PATENT DOCUMENTS

| | | | | | |
|---|---|---|---|---|---|
| 5,080,417 | A | * | 1/1992 | Kanai | 296/37.3 |
| 5,167,433 | A | * | 12/1992 | Ryan | 296/37.1 |
| 5,626,380 | A | * | 5/1997 | Elson et al. | 296/39.1 |
| 5,692,792 | A | * | 12/1997 | Klar | 296/26.02 |
| 5,951,085 | A | * | 9/1999 | Fukatsu | 296/37.8 |
| 7,077,448 | B2 | * | 7/2006 | Maeshima et al. | 296/37.2 |
| 7,337,823 | B2 | * | 3/2008 | Wieczorek et al. | 160/24 |
| 7,600,800 | B2 | * | 10/2009 | Suzuki | 296/37.16 |
| 2001/0040382 | A1 | * | 11/2001 | Nemoto | 296/37.14 |
| 2010/0026031 | A1 | * | 2/2010 | Jouraku | 296/37.16 |
| 2012/0205937 | A1 | * | 8/2012 | Krajenke et al. | 296/76 |
| 2013/0001972 | A1 | * | 1/2013 | Ugalde et al. | 296/24.43 |

FOREIGN PATENT DOCUMENTS

JP 2011-116190 6/2011

* cited by examiner

*Primary Examiner* — Kiran B Patel
(74) *Attorney, Agent, or Firm* — Lerner, David, Littenberg, Krumholz & Mentlik, LLP

(57) ABSTRACT

[Problem to be Solved] An object is to restrict movement of a luggage board in a vehicle front-rear direction and a left-right direction.

[Solution] A vehicle luggage compartment structure includes: luggage side trims 2 covering bulging portions 8 of wheel houses formed in side portions of a luggage compartment; and a luggage board 1 covering a floor surface. Projection-shaped portions 20 are formed in lower portions of the luggage side trims 2 to project to vehicle cabin interior sides. The projection-shaped portions 20 are formed on a front side of the bulging portions 8, at positions where the luggage compartment becomes wider, in a region between a lower end of a seat back 5 and the bulging portions 8. Projecting piece portions 10 projecting to an outer side are provided in side portions of the luggage board 1. Contact portions 31, 32 configured to come in contact with the projection-shaped portions 10 are formed in the projecting piece portions 20.

16 Claims, 3 Drawing Sheets

VEHICLE LUGGAGE COMPARTMENT STRUCTURE

CROSS REFERENCE TO RELATED APPLICATIONS

The present application claims priority from Japanese Patent Application No. 2013-079502 filed Apr. 5, 2013, the disclosure of which is hereby incorporated herein by reference.

TECHNICAL FIELD

The present invention relates to a vehicle luggage compartment structure including a luggage board.

BACKGROUND ART

A luggage compartment is generally provided in a rear portion of a vehicle. There is a luggage compartment in which a luggage board is disposed on a floor. This luggage board is also used as an upper lid of a goods storage box which is provided below a floor portion of the luggage compartment and which is used to store a spare tire, tools, and the like.

The luggage board may move due to vibrations and the like while the vehicle is travelling. A large gap may be formed on one side due to this movement, thereby deteriorating the external appearance.

For example, a technique disclosed in Patent Document 1 is known as a method of suppressing the movement of the luggage board. In this example, a projecting shape is provided in a luggage side trim to prevent lifting of the luggage board and restrict the position of the luggage board in a vehicle front-rear direction.

PRIOR ART

Patent Document

[Patent Document 1] Japanese Patent Application Publication No. 2011-116190

SUMMARY OF INVENTION

Problems to be Solved by the Invention

However, in the example above, although the position of the luggage board can be restricted in an up-down direction and the vehicle front-rear direction, the position cannot be restricted in a vehicle left-right direction.

Moreover, since the projecting shape is attached on a lateral side of a wheel house projecting most to a cabin interior side in the luggage compartment, the projecting shape hinders loading of large cargo. Furthermore, since the projecting shape is disposed at a conspicuous position, the external appearance is also deteriorated.

Methods of suppressing the movement of the luggage board other than that described above includes, for example, a method in which a projecting shape is provided on a side face of the luggage side trim while a protruding and recessed shape is provided in a luggage compartment board side end and the projecting shape and the protruding and recessed shape are fitted to each other to suppress looseness in front, rear, left, and right directions. However, this method has a problem in that the luggage compartment width is locally small and the capacity and ease in loading is thereby deteriorated.

Moreover, it is conceivable to suppress the looseness in front, rear, left, and right directions by fitting a protruding and recessed shape provided in a luggage board side end to a projecting shape in a seat hinge bracket or the like. However, this method cannot be applied to a case in which no projecting shape is provided in the seat hinge bracket or the like.

Furthermore, it is conceivable to suppress the looseness in front, rear, left, and right directions by providing a protruding and recessed shape in a floor panel and fitting the protruding and recessed shape to a luggage board side end. However, this method cannot be applied to a case in which a gap in an up-down direction exists between the luggage board and the floor board.

Moreover, it is conceivable to suppress the looseness in front, rear, left, and right directions by providing an upward protruding shape in a luggage rear trim lower end flange and fitting the protruding shape into a hole provided in the luggage board. However, this method cannot be applied to a case in which the position of the luggage board varies depending on the specifications. Moreover, this method cannot be applied to a case in which the luggage rear trim lower end flange is located above the luggage board.

The present invention has been made to solve the problems described above, and an object thereof is to restrict movement of the luggage board in the vehicle front-rear direction and the left-right direction while suppressing reduction in the loading amount and deterioration in the external appearance.

Means for Solving the Problems

To solve the problems described above, a vehicle luggage compartment structure of the present invention is a vehicle luggage compartment structure including: a luggage side trim covering a bulging portion of a wheel house formed in a side portion of a luggage compartment of a vehicle; and a luggage board covering a floor surface of the luggage compartment, wherein a projection-shaped portion is formed in a lower portion of the luggage side trim to project to an inner side in a vehicle width direction, the projection-shaped portion is formed on a front side of the bulging portion in a vehicle front-rear direction and on an outer side of the bulging portion in the vehicle width direction, at a position where the luggage compartment becomes wider, in a region between a lower end of a seat back and the bulging portion, a projecting piece portion projecting to the outer side in the vehicle width direction is provided in a side portion of the luggage board, and a contact portion configured to come in contact with the projection-shaped portion is provided in the projecting piece portion.

Moreover, in the vehicle luggage compartment structure of the present invention, a projecting amount of the projection-shaped portion to the inner side in the vehicle width direction is smaller than a projecting amount of the bulging portion to the inner side in the vehicle width direction.

Furthermore, in the vehicle luggage compartment structure of the present invention, the contact portion of the projecting piece portion of the luggage board includes a first contact portion configured to come in contact with a rear portion of the projection-shaped portion in the vehicle front-rear direction and a second contact portion configured to come in contact with an end portion of the projection-shaped portion on the inner side in the vehicle width direction.

Moreover, in the vehicle luggage compartment structure of the present invention, a side portion edge of the luggage board in a rear portion of the projecting piece portion in the vehicle front-rear direction comes in contact with a bulging face formed in a front portion of the bulging portion in the vehicle front-rear direction.

Furthermore, in the vehicle luggage compartment structure of the present invention, a contact face of the projection-shaped portion is a perpendicular face extending in a vehicle up-down direction.

Advantageous Effects of the Invention

As described above, the vehicle luggage compartment structure of the present invention is the vehicle luggage compartment structure including: the luggage side trim covering the bulging portion of the wheel house formed in the side portion of the luggage compartment of the vehicle; and the luggage board covering the floor surface of the luggage compartment, wherein the projection-shaped portion is formed in the lower portion of the luggage side trim to project to the inner side in the vehicle width direction, the projection-shaped portion is formed on the front side of the bulging portion in the vehicle front-rear direction and on the outer side of the bulging portion in the vehicle width direction, at the position where the luggage compartment becomes wider, in the region between a lower end of a seat back and the bulging portion, the projecting piece portion projecting to the outer side in the vehicle width direction is provided in the side portion of the luggage board, and the contact portion configured to come in contact with the projection-shaped portion is provided in the projecting piece portion. Accordingly, it is possible to restrict movement of the luggage board in the vehicle front-rear direction and a left-right direction while suppressing reduction in a loading amount and deterioration in an external appearance. Moreover, the projection-shaped portion which is used to restrict the position of the luggage board can be provided at a position different from the bulging portion of the wheel house. Accordingly, compared to a structure in which the projection-shaped portion is provided in the bulging portion, it is possible to prevent projection of a restricting member into the luggage compartment. Hence, in a case of loading luggage, it is possible to prevent the luggage from being caught by the projection-shaped portion and prevent reduction of a loading floor surface. Furthermore, the structure for restricting the position of the luggage board can be provided in a dead space between the rear portion of the seat back and the bulging portion of the wheel house where loading of luggage is difficult. Accordingly, it is possible to make full use of the space in the luggage compartment. Moreover, since the projection-shaped portion is hid behind the bulging portion in loading of luggage from a back door side, it is possible to give an image of a clean luggage compartment space when a back door is opened.

Moreover, in the vehicle luggage compartment structure of the present invention, the projecting amount of the projection-shaped portion to the inner side in the vehicle width direction is smaller than the projecting amount of the bulging portion to the inner side in the vehicle width direction. Accordingly, when luggage is loaded to an inner side near the lower end of the seat back, the luggage does not come into contact with the projection-shaped portion even if the luggage is pushed inside along the bulging portion, and the luggage can be thus prevented from being caught in the loading.

Furthermore, in the vehicle luggage compartment structure of the present invention, the contact portion of the projecting piece portion of the luggage board includes the first contact portion configured to come in contact with the rear portion of the projection-shaped portion in the vehicle front-rear direction and the second contact portion configured to come in contact with the end portion of the projection-shaped portion on the inner side in the vehicle width direction. Accordingly, restriction of the luggage board in the left, right, and front directions is made possible.

Moreover, in the vehicle luggage compartment structure of the present invention, a side portion edge of the luggage board in the rear portion of the projecting piece portion in the vehicle front-rear direction comes in contact with the bulging face formed in the front portion of the bulging portion in the vehicle front-rear direction. Accordingly, the projecting piece portion is interposed between the projection-shaped portion and the bulging face in the vehicle front-rear direction and restriction of the luggage board in the front-rear direction is thereby made possible.

Furthermore, in the vehicle luggage compartment structure of the present invention, the contact face of the projection-shaped portion is a perpendicular face extending in the vehicle up-down direction. Accordingly, the same luggage side trim can be used even when the height of the luggage board is changed due to changes in specifications. Moreover, restriction effects can be maintained even when the luggage board is lifted upward due to vibrations in travelling of the vehicle.

MODE FOR CARRYING OUT THE INVENTION

An embodiment of a vehicle luggage compartment structure in the present invention is described below by using the drawings (FIGS. 1 to 5).

Figure 1:
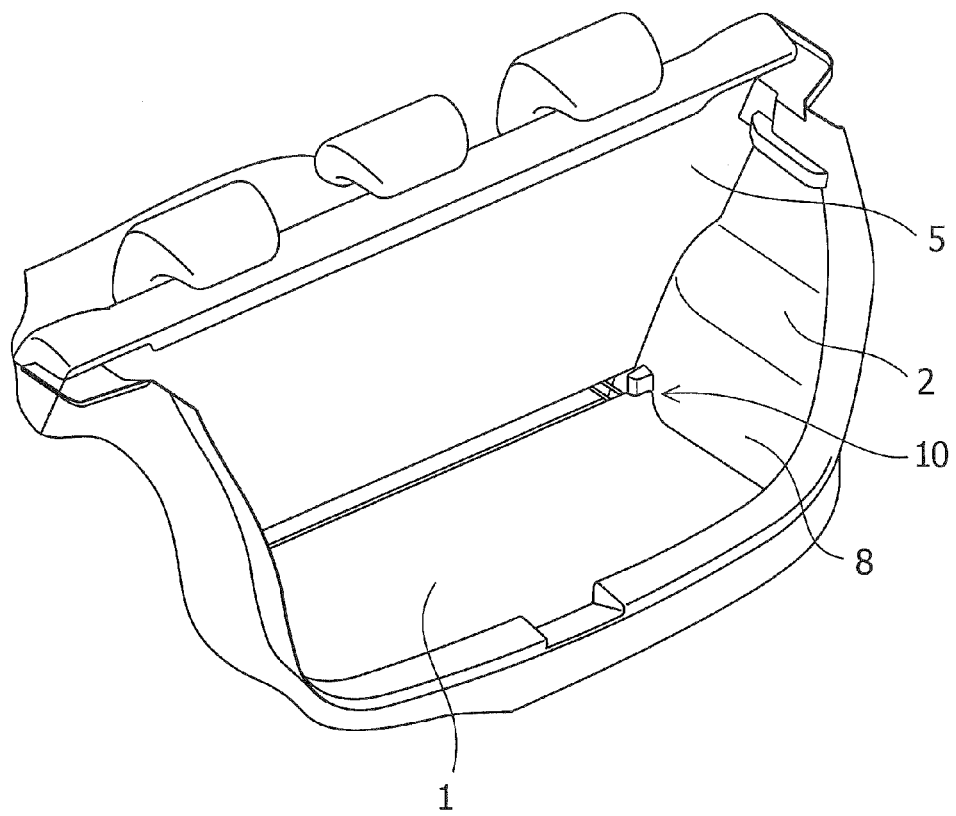
FIG. 1 is a schematic perspective view showing an exterior of a vehicle luggage compartment structure of the present invention.
Figure 2:
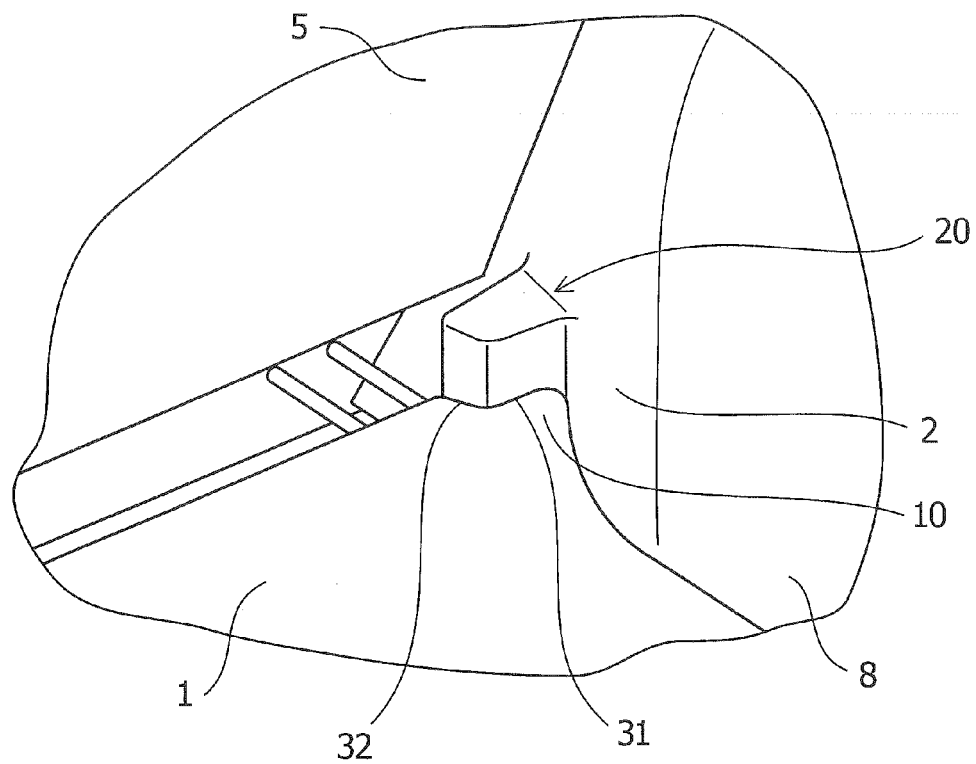
FIG. 2 is an enlarged perspective view showing a portion around a projection-shaped portion of FIG. 1 in an enlarged manner.
Figure 3:
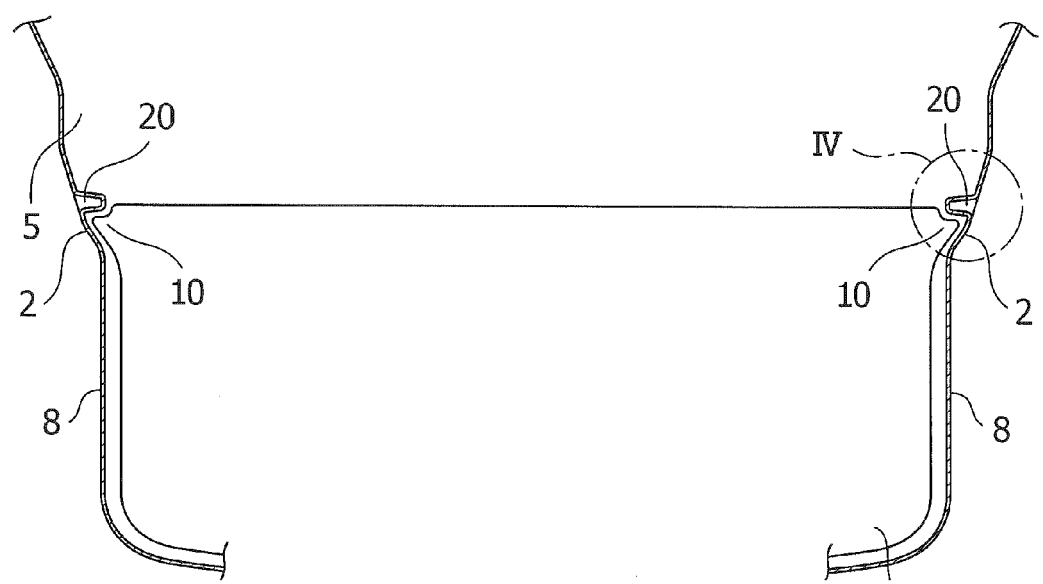
FIG. 3 is a cross-sectional plan view of a luggage compartment in FIG. 1.
Figure 4:
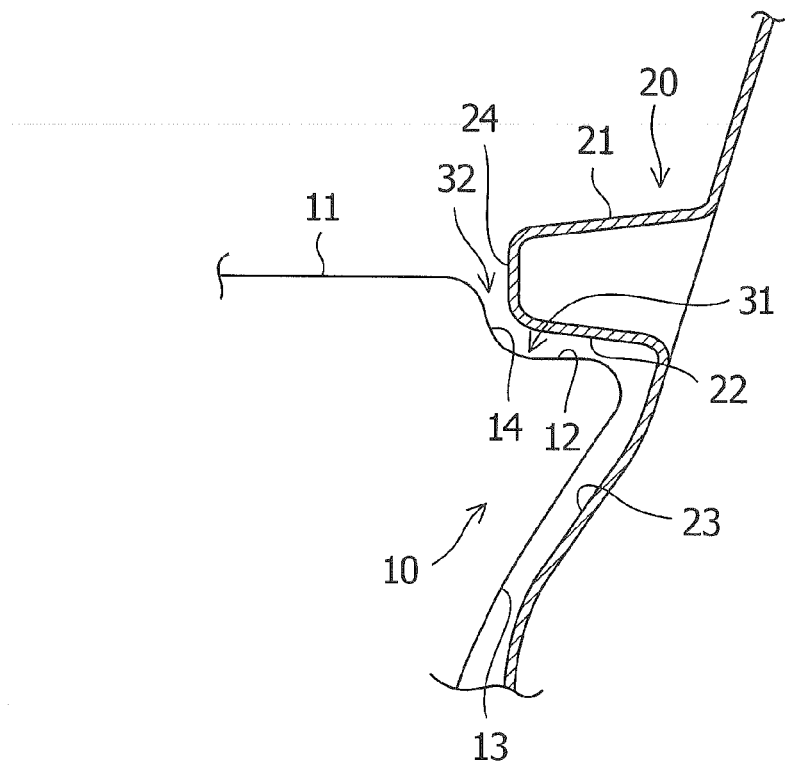
FIG. 4 is an enlarged cross-sectional plan view of the IV portion in FIG. 3.
Figure 5:
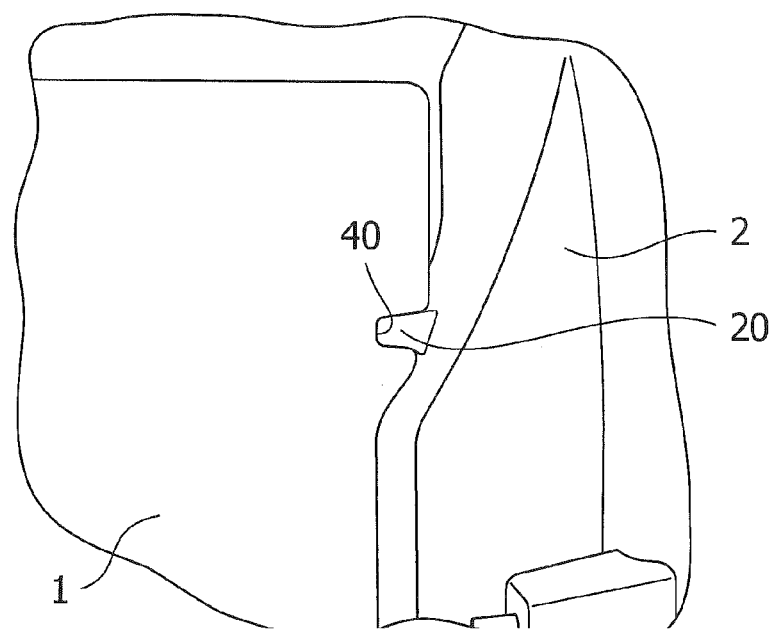
FIG. 5 is a cross-sectional plan view showing a modification example of FIG. 1.

FIG. 1 is a schematic perspective view showing an exterior of the vehicle luggage compartment structure of the embodiment. FIG. 2 is an enlarged perspective view showing a portion around a projection-shaped portion 20 of FIG. 1 in an enlarged manner. FIG. 3 is a cross-sectional plan view of a luggage compartment in FIG. 1. FIG. 4 is an enlarged cross-sectional plan view of the IV portion in FIG. 3. FIG. 5 is a cross-sectional plan view showing a modification example of FIG. 1.

The vehicle luggage compartment structure of the embodiment includes luggage side trims 2 and a luggage board 1.

The luggage side trims 2 are interior members covering bulging portions 8 of wheel houses formed in side portions of a luggage compartment of a vehicle.

As shown in FIGS. 1 and 2, the projection-shaped portions 20 are formed in the luggage side trims 2. The projection-shaped portions 20 are formed inside the luggage compartment on both sides thereof in a vehicle width direction. The projection-shaped portions 20 are formed on outer sides of the bulging portions 8 in the vehicle width direction and on a front side of the bulging portions 8 in a vehicle front-rear direction, in a region between a lower end of a seat back 5 and the bulging portions 8.

The projection-shaped portions 20 are formed in lower portions of the luggage side trims 2. Moreover, the projection-shaped portions 20 are formed to face a lower portion of the seat back 5. Furthermore, the projection-shaped portions 20 project to vehicle cabin sides in the vehicle width direction. In addition, the projection-shaped portions 20 are formed on the front side of the bulging portions 8 of the wheel houses in the vehicle front-rear direction.

Projecting piece portions 10 are formed in front portions of the luggage board 1 on both sides in the vehicle width direction. Each of the projecting piece portions 10 is provided with a first contact portion 31 configured to come in contact with a vehicle rear side face of the corresponding projection-shaped portion 20 and a second contact portion 32 configured to come in contact with an end of the corresponding projecting piece portion 10 on a cabin interior side.

Shapes of the projection-shaped portions 20, the projecting piece portions 10, and their vicinity are described with reference to FIG. 4.

A luggage side trim front face 21, a luggage side trim inner face 24, and a luggage side trim front-direction restriction face 22 are formed in each of the projection-shaped portions 20.

The luggage side trim front face 21 is a portion of the projection-shaped portion 20 which is facing a vehicle front side. The luggage side trim inner face 24 is a face which extends from a vehicle width direction inner end of the luggage side trim front face 21 toward the rear of the vehicle. The luggage side trim inner face 24 is provided to face a luggage board inner face 14, to be described later.

The luggage side trim front-direction restriction face 22 is formed to extend from a vehicle rear side end of the luggage side trim inner face 24 to the outer side in the vehicle width direction, and an outer portion of the luggage side trim front-direction restriction face 22 in the vehicle width direction is formed to be continuous with a side face of the corresponding luggage side trim 2. The luggage side trim front-direction restriction face 22 is provided to face a luggage board front-direction restriction face 12, to be described later.

Moreover, a luggage side trim left-right-rear-direction restriction face 23 is formed in a portion of the side face of each luggage side trim 2. The luggage side trim left-right-rear-direction restriction face 23 is a face formed to be continuous with the luggage side trim front-direction restriction face 22. In other words, the luggage side trim left-right-rear-direction restriction face 23 is formed in a vehicle rear side portion of a surface of the luggage side trim 2.

Each of the projecting piece portions 10 is a portion formed to be continuous with a luggage board front face 11. The luggage board inner face 14, the luggage board front-direction restriction face 12, and a luggage board left-right-rear-direction restriction face 13 are formed in each projecting piece portion 10.

Moreover, a projecting amount of the end portion of each projection-shaped portion 20 to the cabin interior side is smaller than a projecting amount of each bulging portion 8 to the cabin interior side. Here, the end portion of the projection-shaped portion 20 is the luggage side trim inner face 24. Specifically, the position of the luggage side trim inner face 24 in the vehicle width direction is on the vehicle width direction outer side of the innermost face of the bulging portion 8 in the vehicle width direction.

The luggage board front face 11 is a front-most portion of the luggage board 1. The luggage board inner face 14 is a face extending from a vehicle width direction outer end of the luggage board front face 11 toward the rear of the vehicle, and is provided to face the luggage side trim inner face 24. The luggage board inner face 14 can come into contact with the luggage side trim inner face 24 and is the second contact portion 32.

The luggage board front-direction restriction face 12 is a portion extending from a vehicle rear side end of the luggage board inner face 14 to the outer side in the vehicle width direction and is provided to face the luggage side trim front-direction restriction face 22. The luggage board front-direction restriction face 12 can come into contact with the luggage side trim front-direction restriction face 22 and forms the first contact portion 31.

The luggage board left-right-rear-direction restriction face 13 is a side portion edge of a rear portion of the projecting piece portion 10 and is a portion which curves from a vehicle width direction outer end of the luggage board front-direction restriction face 12 toward the rear of the vehicle and which extends toward the inner side in the vehicle width direction and toward the rear of the vehicle. The luggage board left-right-rear-direction restriction face 13 is provided to face and come in contact with a bulging face forming a front portion of the bulging portion 8, i.e. the luggage side trim left-right-rear-direction restriction face 23.

Faces which are contact surfaces of each projection-shaped portion 20, i.e. the luggage side trim inner face 24 and the luggage side trim front-direction restriction face 22, are faces extending in a vehicle up-down direction and are perpendicular to a face of the luggage board 1. In this example, the faces 24 and 22 are almost vertical.

Note that although the projection-shaped portion 20 and the like on the right side of FIG. 3 are shown in FIG. 4, the projection-shaped portion 20 and the like on the left side are also formed as described above.

Movement of the luggage board 1 is restricted by engagement between the projection-shaped portions 20 formed in the luggage side trims 2 and the projecting piece portions 10 formed in the luggage board 1.

When a force causing the luggage board 1 to move frontward acts, the luggage board front-direction restriction faces 12, which are the first contact portions 31, come into contact with the luggage side trim front-direction restriction faces 22. This prevents the luggage board 1 from moving forward. Moreover, the contact faces serve as the center of rotating trajectory in take-out of the luggage board 1.

When a force causing the luggage board 1 to move rearward, leftward, or rightward acts, the luggage board inner faces 14 which are the second contact portions 32 come into contact with the luggage side trim inner faces 24. At this time, the luggage board left-right-rear-direction restriction faces 13 come into contact with the luggage side trim left-right-rear-direction restriction faces 23. This prevents the luggage board 1 from moving leftward, rightward, and rearward.

Configuring the vehicle luggage compartment as described above can provide the projection-shaped portions 20, used to restrict the position of the luggage board 1, at positions different from the bulging portions 8 of the wheel houses. Accordingly, compared to a structure in which the projection-shaped portions 20 are provided in the bulging portions 8, it is possible to prevent projection of the projection-shaped portions 20, which are restricting members, to the luggage compartment sides. Hence, in a case of loading luggage, it is possible to prevent the luggage from being caught by the projection-shaped portions 20 and prevent reduction of a loading floor surface. Furthermore, a flat luggage compartment can be obtained across the entire width between wheel house portions.

Moreover, since the structure for restricting movement can be provided in a dead space between the rear portion of the seat back 5 and the bulging portion 8 of each wheel house where loading of luggage is difficult, it is possible to make full use of the space in the luggage compartment.

Furthermore, since the projection-shaped portions 20 are hidden behind the bulging portions 8 of the wheel houses in loading of luggage from a back door side, it is possible to give an image of a clean luggage compartment space when a back door is opened, and an exterior appearance is improved.

In addition, when luggage is loaded to an inner side near the lower end of the seat back 5, the luggage does not come into contact with the projection-shaped portions 20 even if the luggage is pushed inside along the bulging portions 8 of the wheel houses, and the luggage can be prevented from being caught in the loading. Moreover, restriction of the luggage board 1 in the left, right, front, and rear directions is made possible.

Furthermore, since the contact faces of the projection-shaped portions 20 are perpendicular as described above, the same luggage side trims 2 (quarter trims) can be used even when the height of the luggage board 1 is changed due to changes in specifications. Moreover, restriction effects can be maintained even when the luggage board 1 is lifted upward due to vibrations in travelling.

In addition, when a carpet is laid on the luggage board 1, the carpet can be made to sharply project to the outer side in the vehicle width direction, in the aforementioned portions for restricting the position. Due to this configuration, displacement of the carpet toward the rear can be prevented at inclined surfaces of the wheel houses by putting sharp regions of the carpet into a space between the front faces of the wheel houses and the rear faces of the projection-shaped portions 20, without putting notches of the carpet into small projections.

As is apparent from the aforementioned description, the embodiment can restrict the movement of the luggage board 1 in the vehicle front-rear direction and the left-right direction while suppressing reduction in the loading amount and deterioration in the external appearance.

The description of the aforementioned embodiment shows an example for explaining the present invention and does not limit the invention described in the claims. Moreover, configurations of parts in the present invention are not limited to those in the aforementioned embodiment and various modifications can be made within the technical scope described in the claims.

For example, as shown in FIG. 5, when a space can be secured between the seat back 5 and each wheel house in the vehicle front-rear direction, it is possible to extend the luggage board 1 forward and form a notch 40 as the contact portion.

The luggage side trim inner face 24 and the luggage side trim front face 21 have shapes extending linearly but are not limited to such shapes. For example, the faces 24 and 21 may have curved shapes. Moreover, the luggage board inner face 14 and the luggage board front face 11 may have shapes other than those described above and be curved.

REFERENCE SIGNS LIST 1 luggage board
2 luggage side trim
5 seat back
8 bulging portion
10 projecting piece portion
11 luggage board front face
12 luggage board front-direction restriction face
13 luggage board left-right-rear-direction restriction face
14 luggage board inner face
20 projection-shaped portion
21 luggage side trim front face
22 luggage side trim front-direction restriction face
23 luggage side trim left-right-rear-direction restriction face
24 luggage side trim inner face
31 first contact portion
32 second contact portion
40 notch

The invention claimed is:

1. A vehicle luggage compartment structure comprising:
a luggage side trim covering a bulging portion of a wheel house formed in a side portion of a luggage compartment of a vehicle; and
a luggage board covering a floor surface of the luggage compartment, wherein
a projection-shaped portion is formed in a lower portion of the luggage side trim to project to an inner side in a vehicle width direction,
the projection-shaped portion is formed on a front side of the bulging portion in a vehicle front-rear direction and on an outer side of the bulging portion in the vehicle width direction, at a position where the luggage compartment becomes wider, in a region between a lower end of a seat back and the bulging portion,
a projecting piece portion projecting to the outer side in the vehicle width direction is provided in a side portion of the luggage board, and
a contact portion configured to come in contact with the projection-shaped portion is provided in the projecting piece portion.

2. The vehicle luggage compartment structure according to claim 1, wherein a projecting amount of the projection-shaped portion to the inner side in the vehicle width direction is smaller than a projecting amount of the bulging portion to the inner side in the vehicle width direction.

3. The vehicle luggage compartment structure according to claim 2, wherein the contact portion of the projecting piece portion of the luggage board includes a first contact portion configured to come in contact with a rear portion of the projection-shaped portion in the vehicle front-rear direction and a second contact portion configured to come in contact with an end portion of the projection-shaped portion on the inner side in the vehicle width direction.

4. The vehicle luggage compartment structure according to claim 3, wherein a side portion edge of the luggage board in a rear portion of the projecting piece portion in the vehicle front-rear direction comes in contact with a bulging face formed in a front portion of the bulging portion in the vehicle front-rear direction.

5. The vehicle luggage compartment structure according to claim 4, wherein a contact face of the projection-shaped portion is a perpendicular face extending in a vehicle up-down direction.

6. The vehicle luggage compartment structure according to claim 1, wherein the contact portion of the projecting piece portion of the luggage board includes a first contact portion configured to come in contact with a rear portion of the projection-shaped portion in the vehicle front-rear direction and a second contact portion configured to come in contact with an end portion of the projection-shaped portion on the inner side in the vehicle width direction.

7. The vehicle luggage compartment structure according to claim 1, wherein a side portion edge of the luggage board in a rear portion of the projecting piece portion in the vehicle front-rear direction comes in contact with a bulging face formed in a front portion of the bulging portion in the vehicle front-rear direction.

8. The vehicle luggage compartment structure according to claim 1, wherein a contact face of the projection-shaped portion is a perpendicular face extending in a vehicle up-down direction.

9. The vehicle luggage compartment structure according to claim 2, wherein a side portion edge of the luggage board in a rear portion of the projecting piece portion in the vehicle front-rear direction comes in contact with a bulging face formed in a front portion of the bulging portion in the vehicle front-rear direction.

10. The vehicle luggage compartment structure according to claim 2, wherein a contact face of the projection-shaped portion is a perpendicular face extending in a vehicle up-down direction.

11. The vehicle luggage compartment structure according to claim 3, wherein a contact face of the projection-shaped portion is a perpendicular face extending in a vehicle up-down direction.

12. The vehicle luggage compartment structure according to claim 9, wherein a contact face of the projection-shaped portion is a perpendicular face extending in a vehicle up-down direction.

13. The vehicle luggage compartment structure according to claim 6, wherein a side portion edge of the luggage board in a rear portion of the projecting piece portion in the vehicle front-rear direction comes in contact with a bulging face formed in a front portion of the bulging portion in the vehicle front-rear direction.

14. The vehicle luggage compartment structure according to claim 6, wherein a contact face of the projection-shaped portion is a perpendicular face extending in a vehicle up-down direction.

15. The vehicle luggage compartment structure according to claim 13, wherein a contact face of the projection-shaped portion is a perpendicular face extending in a vehicle up-down direction.

16. The vehicle luggage compartment structure according to claim 7, wherein a contact face of the projection-shaped portion is a perpendicular face extending in a vehicle up-down direction.

\* \* \* \* \*